No. 883,840. PATENTED APR. 7, 1908.
M. V. TAGGART.
COMBINED DISH PAN AND DRAINER.
APPLICATION FILED MAY 8, 1906.
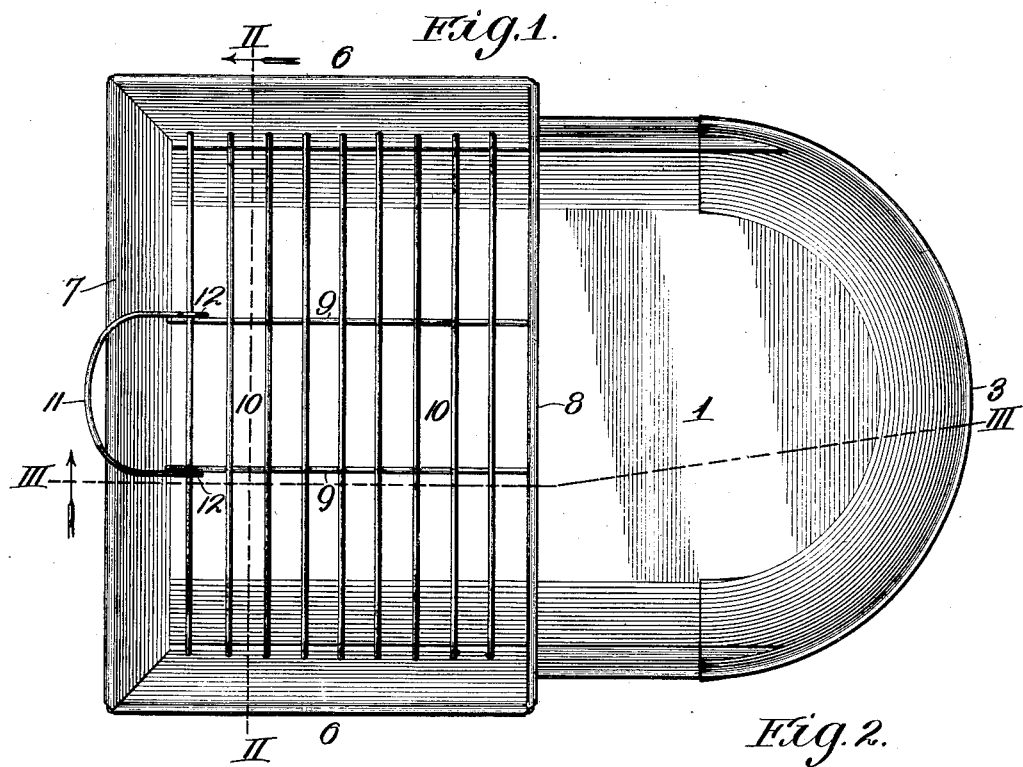
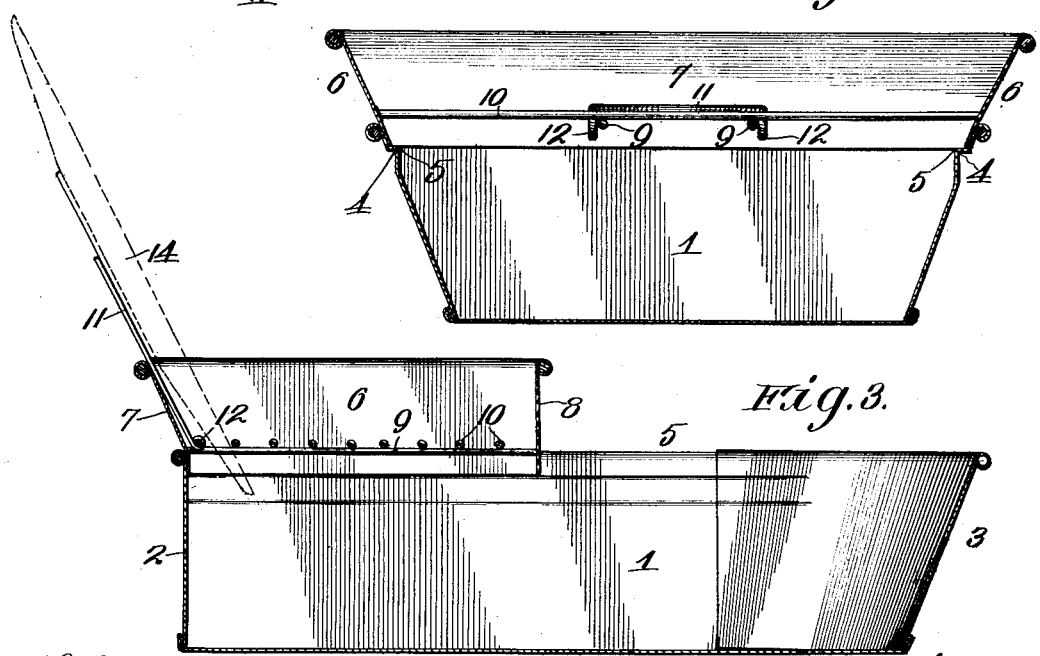
Witnesses
Frank R. Glow
H. C. Rodgers
Inventor
M. V. Taggart
By George Y. Thorpe atty.

UNITED STATES PATENT OFFICE.

MARTIN V. TAGGART, OF GRENOLA, KANSAS.

COMBINED DISH PAN AND DRAINER.

No. 883,840.

Specification of Letters Patent.

Patented April 7, 1908.

Application filed May 8, 1906. Serial No. 315,757.

*To all whom it may concern:*

Be it known that I, MARTIN V. TAGGART, a citizen of the United States, residing at Grenola, in the county of Elk and State of Kansas, have invented certain new and useful Improvements in Combined Dish Pans and Drainers, of which the following is a specification.

This invention relates to combined dish-pans and drainers, and my object is to produce a household article of this character which will enable the dishes to be washed and the water to be drained therefrom in an expeditious and convenient manner.

A further object is to produce an article of this character of simple, strong, durable and cheap construction.

To these ends the invention consists in certain novel and peculiar features of construction and organization as hereinafter described and claimed; and in order that it may be fully understood reference is to be had to the accompanying drawing, in which—

Figure 1, is a top plan view of a combined dish-pan and drainer arranged in operative relation, embodying my invention. Fig. 2, is a section on the line II—II of Fig. 1. Fig. 3, is a section on the line III—III of Fig. 1.

In the said drawings, 1 indicates a dish-pan of greater length than width by preference and having its rear wall 2 vertical and at right angles to its sides and its front wall 3 inclined and round. The walls of the pan may be made from one piece of sheet metal if desired or the rounded portion may be joined to the front ends of the side walls, and the side walls are longitudinally indented as at 4, in any suitable manner so as to provide the internal upwardly disposed shoulders 5 below its upper edge.

The dish-drainer preferably consists of a piece of sheet metal bent to form side walls 6 converging downwardly at about the same angle as the side walls of the pan and adapted to fit down into the latter and rest on the shoulders 5. The rear wall 7 of the drainer is preferably pitched downward and forward and is adapted to project down into the pan near the rear wall thereof. The front wall 8 of the drainer is preferably vertical and it is preferable that the drainer shall engage the side walls of the pan with sufficient friction to prevent its accidental dislodgment.

The drainer is preferably of angular form so as to be held against turning by the walls of the pan when it is in position thereon.

The bottom of the drainer is of skeleton formation and consists preferably of a pair of rods 9 extending from the front to the rear wall, and a series of closely arranged cross rods 10 which extend between the side walls of the drainer and are supported intermediate of their ends upon rods 9.

11 indicates a dish-support shown in the form of a bail hinged as at 12 to the cross rod 10 nearest wall 7. The dish support may be used to suspend the drainer from a hook when not in use or may be folded down to the position shown in Fig. 2. When in use the dish support is turned up so as to rest against and extend above the rear wall of the drainer as shown in Figs. 1 and 3, in order that it may form a support for a plate or other dish as shown at 14, fitted down between the rearmost pair of cross rods 10, and prevented from rolling thereon by the rods 9 succeeding plates or dishes being arranged between other of said cross rods, the second plate leaning against the first and the third against the second and so on, it being understood of course that the dishes may be stacked in the drainer in any suitable or preferred manner.

It will be observed that the drainer presents an open-bottom rack upon which the dishes will be supported by their edges in a substantially upright position so that the water will drain readily and rapidly from each plate or dish and there will be no liability of the dishes falling and breaking.

While in the drainer boiling water may be poured upon the dishes to rinse them and facilitate the drying operation, and it will be apparent that the projecting of the pan forwardly beyond the dish drainer permits washing of dishes in the pan with convenience and that after being washed they may be stacked upon the drainer without requiring the dishwasher to take any unnecessary steps, the combined article therefore reducing the work of dish washing.

From the above description it will be apparent that I have produced a dish-pan and drainer embodying the features of advantage enumerated as desirable in the statement of the object of the invention and I wish it to be understood that I do not desire to be limited to the exact details of construction shown and described as changes in the form, proportion, and arrangement of the parts may be made without departing from the principle of construction involved.

Having thus described the invention what I claim as new and desire to secure by Letters Patent, is:—

The improved article herein described and shown consisting of a pan having parallel sides and one angular end, and provided on its sides below the upper edges thereof with longitudinal shoulders extending forward from said angular end, and a drainer having an open bottom and having its sides shaped to fit snugly within the angular end of the pan and rest on the shoulders on the sides thereof and project above said sides and end, longitudinal rods secured in and extending between the end walls of the drainer at the lower edges of the same, transverse rods secured to and extending between the sides of the drainer at the lower edges of the same and resting upon the longitudinal rods, and a dish-supporting bail having its ends pivotally hung on the rearmost transverse rod and bearing laterally against the longitudinal rods.

In testimony whereof, I affix my signature in the presence of two witnesses.

MARTIN V. TAGGART.

Witnesses:
L. J. WELLS,
ROY S. BOUDEN.